P. C. PEDERSEN.
VEGETABLE PULLING AND TOPPING MACHINE.
APPLICATION FILED OCT. 14, 1915.
1,181,923.
Patented May 2, 1916.
2 SHEETS—SHEET 1.
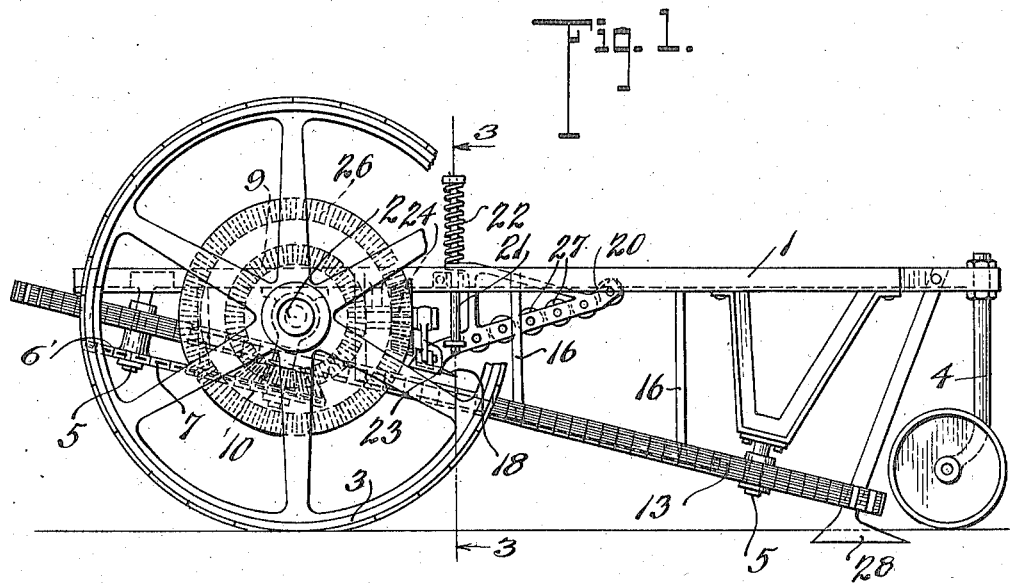
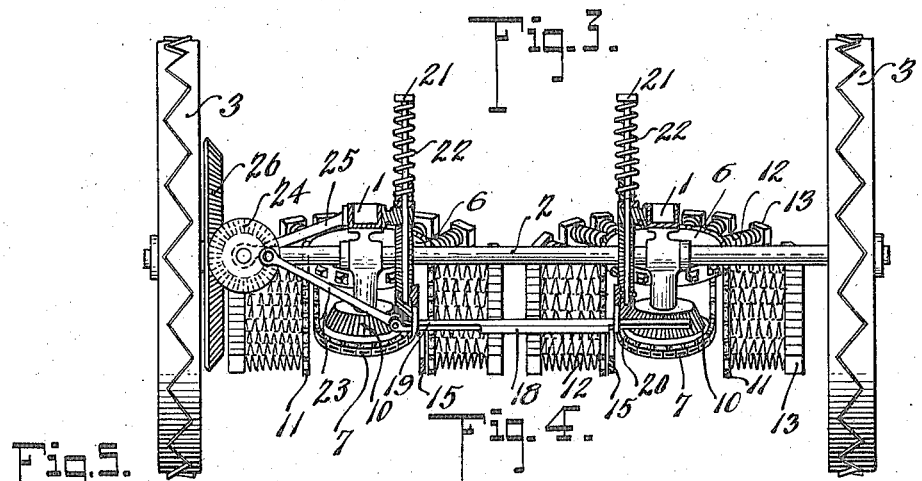
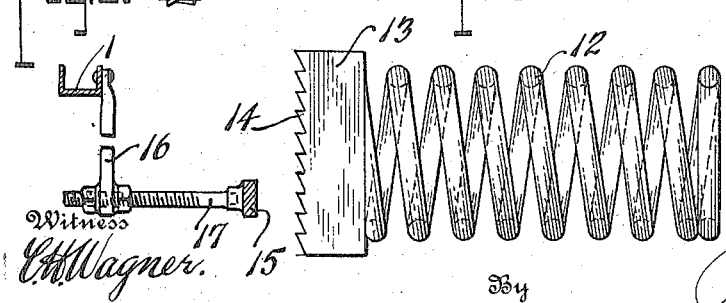
Witness
C. H. Wagner.
Inventor
P. C. Pedersen
By
Robb & Robb
Attorneys.

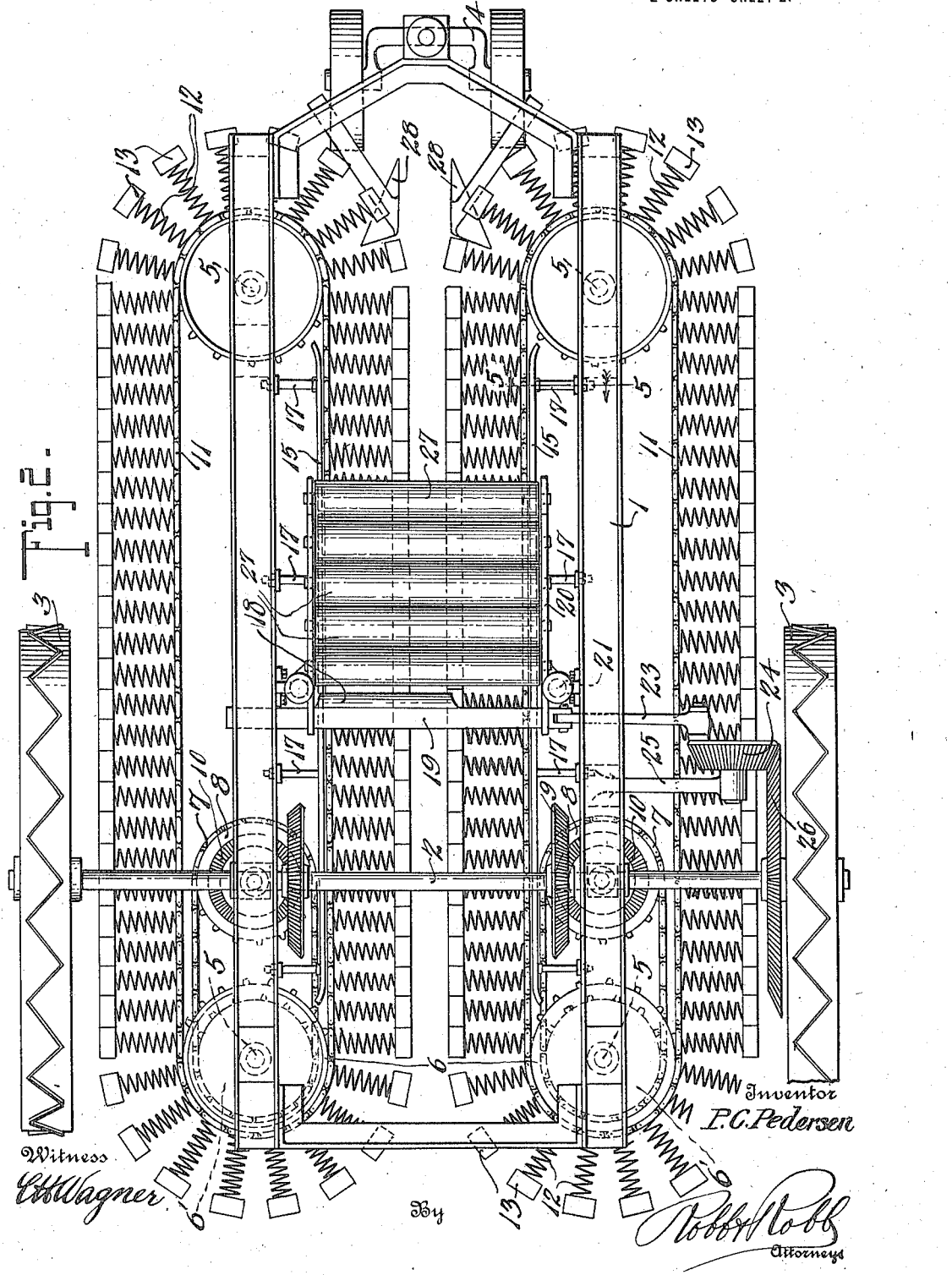

UNITED STATES PATENT OFFICE.

PEDER CHRISTIAN PEDERSEN, OF BJERRESÖ, DENMARK, ASSIGNOR OF ONE-HALF TO LAURITS PEDERSEN, OF OMAHA, NEBRASKA.

VEGETABLE PULLING AND TOPPING MACHINE.

1,181,923.     Specification of Letters Patent.     Patented May 2, 1916.

Application filed October 14, 1915. Serial No. 55,866.

*To all whom it may concern:*

Be it known that I, PEDER CHRISTIAN PEDERSEN, a subject of the King of Denmark, residing at Bjerresö, Hörve Station, Denmark, Europe, have invented certain new and useful Improvements in Vegetable Pulling and Topping Machines, of which the following is a specification.

The present invention relates to improvements in agricultural implement, more particularly to that type designed for pulling and topping vegetables such as turnips, beets and the like.

The object of my invention is to provide a machine of this character embodying means to extract the vegetables from the ground and convey them to cutting mechanism for severing the tops, the conveying means comprising yieldable engaging members to effectively grip vegetables of varying sizes.

Another object in view is to provide novel means coöperating with the cutting mechanism whereby to control automatically the operation of severing the tops according to the growth thereof, such means imparting a floating movement to the cutting instrumentalities.

A still further object lies in the provision of adjusting means for the conveying mechanism whereby the distance between the coacting conveyer members may be regulated in accordance with the nature or size of the vegetable operated upon.

These and such other objects as may hereinafter appear are attained by the novel construction, combination and arrangement of parts to be hereinafter specifically described and claimed.

Reference will now be had to the accompanying drawings forming a part of this specification, wherein;

Figure 1 is a side elevation of an apparatus constructed in accordance with my invention. Fig. 2 is an enlarged top plan view thereof. Fig. 3 is a vertical sectional view on the line 3—3 of Fig. 1. Fig. 4 is an enlarged detail view of one of the gripping members for the conveying mechanism. Fig. 5 is a sectional view taken about on the line 5—5 of Fig. 2.

Throughout the following detail description, and on the several figures of the drawings, similar parts are referred to by like reference characters.

Referring to the drawings, and specifically describing my apparatus, the numeral 1 designates a frame supported upon the driving axle 2 provided with the ground wheels 3. The forward portion of the frame is supported by the guiding truck 4 and to this end of the machine the customary draft means (not shown) are attached. Supported by pivots 5 from the frame 1 are larger sprockets 6, the rear ones of which are driven by the smaller sprockets 6' which are operatively connected by the driving chains 7 to the driving sprockets 8 in turn connected to the driving axle 2 by means of the beveled gears 9, 10. Passing around the larger sprockets 6 are coacting conveyer members comprising the endless chains 11. It will be observed by reference particularly to Fig. 2 that each of these chains carries a plurality of vegetable gripping elements one of which is most distinctly disclosed in Fig. 4 of the drawings. Each of the gripping members consists of a spiral spring 12 attached at one end to a link of the conveyer chain 11 carrying at its opposite end a head or block 13, the inner face of which is preferably serrated or toothed as at 14 to provide for adequate gripping engagement with the vegetables in the use of the apparatus. It will be apparent that the resiliency of the springs 12 will permit desirable yielding on the part of the gripping members to accommodate vegetables of varying sizes.

The apparatus being designed to operate upon different characters of vegetables, it is desirable to provide for adjustment of the conveyer members with respect to each other so as to vary the distance between the normal positions of the vegetable engaging members hereinbefore described. This adjustment is accomplished by providing a rail or bar 15 suspended from each side member of the frame 1 by means of arms 16, the rail or bar being connected to said arm by the adjusting bolts 17 (see Fig. 5). Thus to adjust the inner sections of the conveyer chains closer together or farther apart it is only necessary to adjust the rails 15 inwardly or outwardly, thereby lessening or widening the distance between the coacting vegetable engaging heads 13 carried by the conveyer chains.

Cutting mechanism for severing the tops from the vegetables is associated with the conveyer chains and comprises a knife 18 carried by a horizontally disposed slide bar 19 mounted for reciprocation in the lower extremities of the frame 20, which is supported upon the vertically disposed bolts 21 in turn carried by the side members of the frame 1. Interposed between the frame members and the tops of the bolts are springs 22, said springs permitting yielding of the frame as will be hereinafter more fully set forth. The cutting device carried by this yieldable frame is actuated through the pitman 23 by the beveled pinion 24 supported from the frame on the arm 25 and meshing with the driving gear 26 carried by the driving axle 2. It will be observed that the yieldable frame 20 has its side members inclined at an angle of substantially 45° to the plane of the conveyer chains and said side members of this frame carry a plurality of rollers 27 by which the tops of the vegetables are engaged as they are brought toward the rear of the machine by the conveyer members. This engaging action causes the automatic adjustment of the cutting device to arrange for severing the tops at the proper point depending, of course, upon the growth of the foliage of the vegetables operated upon. The knife is thus provided with a floating support.

In operation of the device, it will be understood that the machine is advanced over the rows of vegetables which are loosened or more or less extracted from the ground by means of the spaced plows or shovels 28 at the forward portion of the machine. The vegetables are then gripped by the yieldable gripping members carried by the conveyer chains and conveyed upwardly and toward the rear of the machine to the topping mechanism. As the tops pass under the yieldable frame 20, they are pressed forwardly and automatically the frame is adjusted at the proper position for the knife 18 to sever the tops from the vegetables whereupon they continue until they drop from the rear of the machine.

Having thus described my invention, what I claim as new is:

1. A vegetable pulling and topping machine of the class described comprising a wheeled support, conveying mechanism carried thereby, a frame yieldably connected to the support in superposed relation to the conveying mechanism, roller members mounted in said frame for engaging the tops to exert pressure thereagainst, and a cutting device arranged on the frame in rear of the rollers for severing the tops.

2. A vegetable pulling and topping machine of the class described comprising a wheeled support, conveying mechanism carried thereby, a frame yieldably connected to the support in superposed relation to the conveying mechanism, roller members mounted in said frame for engaging the tops to exert pressure thereagainst, a cutting device arranged on the frame in rear of the rollers for severing the tops, and means for reciprocating the cutting device transversely of the frame.

3. A vegetable pulling and topping machine of the class described comprising a wheeled support, conveying mechanism carried thereby, means for operating said conveying mechanism, topping mechanism comprising a frame arranged above the conveying mechanism, roller members mounted in said frame at an angle to the plane of the conveying mechanism, supporting members connecting said frame to the wheeled support, means coacting with said supporting members and the wheeled support for yieldably holding the frame in position, a cutting device mounted for reciprocation in said frame, and a pitman connection for said cutting device whereby to actuate the latter transversely of said frame.

In testimony whereof I affix my signature.

PEDER CHRISTIAN PEDERSEN.